US007739949B2

(12) United States Patent
Justesen et al.

(10) Patent No.: US 7,739,949 B2
(45) Date of Patent: Jun. 22, 2010

(54) METHOD AND DEVICE FOR CUTTING AND CORING MATERIALS IN A HYDROCUTTING APPARATUS

(76) Inventors: Neil Justesen, 238 W. 35th South, Burley, ID (US) 83318-5073; Fred Leoni, 238 W. 35th South, Burley, ID (US) 83318-5073

( * ) Notice: Subject to any disclaimer, the term of this patent is extended or adjusted under 35 U.S.C. 154(b) by 708 days.

(21) Appl. No.: 11/457,488

(22) Filed: Jul. 14, 2006

(65) Prior Publication Data

US 2008/0011165 A1 Jan. 17, 2008

(51) Int. Cl.
*A47J 25/00* (2006.01)
*B26D 1/03* (2006.01)

(52) U.S. Cl. ............................ 99/547; 99/549; 99/565; 83/98; 83/102; 83/402

(58) Field of Classification Search ....................... None
See application file for complete search history.

(56) References Cited

U.S. PATENT DOCUMENTS

| | | | | | |
|---|---|---|---|---|---|
| 133,914 | A | * | 12/1872 | Alexander | 99/545 |
| 419,722 | A | * | 1/1890 | Siersdorfer | 99/545 |
| 1,466,114 | A | * | 8/1923 | Buchi | 30/302 |
| 3,128,810 | A | * | 4/1964 | Whipp | 99/545 |
| 3,361,173 | A | * | 1/1968 | Lamb | 83/23 |
| 4,337,693 | A | * | 7/1982 | Dandrea | 99/491 |
| 4,372,184 | A | * | 2/1983 | Fisher et al. | 83/98 |
| 4,423,652 | A | * | 1/1984 | Winslow | 83/24 |
| 4,497,245 | A | * | 2/1985 | Mori | 99/542 |
| 4,840,737 | A | | 6/1989 | Henriquez | |
| 4,911,045 | A | | 3/1990 | Mendenhall | |
| 5,042,342 | A | | 8/1991 | Julian | |
| 5,046,388 | A | | 9/1991 | Mendenhall | |
| 5,069,100 | A | * | 12/1991 | Jackson | 83/857 |
| 5,101,718 | A | * | 4/1992 | Lin | 99/545 |
| 5,337,480 | A | | 8/1994 | Codikow | |
| 5,343,791 | A | | 9/1994 | Julian et al. | |
| 5,384,043 | A | | 1/1995 | Bianchi et al. | |
| 5,390,590 | A | * | 2/1995 | Mendenhall | 99/537 |
| 5,421,249 | A | | 6/1995 | Repisky et al. | |
| 5,655,428 | A | | 8/1997 | Cockburn et al. | |
| 5,667,682 | A | | 9/1997 | Laird | |
| 6,129,624 | A | * | 10/2000 | Niklason | 452/106 |
| 6,274,046 | B1 | | 8/2001 | Lundback | |
| 2006/0027068 | A1 | * | 2/2006 | Jensen | 83/662 |

FOREIGN PATENT DOCUMENTS

| | | |
|---|---|---|
| GB | 1500250 | 2/1978 |

* cited by examiner

*Primary Examiner*—Joseph M Pelham
(74) *Attorney, Agent, or Firm*—Frank J. Dykas; Derek H. Maughan; Dykas, Shaver & Nipper, LLP

(57) ABSTRACT

A method and device for coring and cutting food products such as peppers in a hydrocutter. The preferred embodiment of the invention includes an outer rim, which is configured for placement within a hydrocutter. This rim has a first end and a second end and defines a passageway there through. A coring cutter is suspended in a generally centrally located position within this passageway. This coring cutter includes pairs of peaks and troughs which are positioned so as to impact the item being processed prior to the other portions of the coring cutter and by so doing enable the device to be cut with decreased amounts of force and water pressure upon the device. Thus preserving fragile structures such as a pepper.

18 Claims, 5 Drawing Sheets

METHOD AND DEVICE FOR CUTTING AND CORING MATERIALS IN A HYDROCUTTING APPARATUS

FIELD OF THE INVENTION

The present invention generally relates to hydrocutting devices which are utilized to cut and process food products and more particularly to a method and device for cutting and coring food products such as peppers utilizing such a hydrocutting apparatus.

BACKGROUND OF THE INVENTION

Hydraulic food cutting apparatus' have been known and used commercially for over thirty years. Their general principles of operation are well known. Food pieces that are to be cut or processed are dropped into a feed tank containing water. The water, with the entrained food pieces, is then pumped into a pipe and into the front half of a venturi where the potatoes are accelerated to velocities of approximately forty to sixty feet per second. At the narrowest point of the venturi, a fixed array of cutting blades are positioned, and as the food product impinges upon the blade, this food is cut into a plurality of smaller pieces. For example, French fry pieces are many times cut from whole potatoes utilizing such a process and device. After the pieces have been cut from the blade, the food pieces enter the second half of the venturi where they are decelerated and deposited upon a conveyor of some sort where the cut food pieces are separated from the water. The water is then recycled back to the feed tank for further use. The cut food pieces are then conveyed on for further processing as may be appropriate.

While the concept is simple, its execution in practice is far more difficult. The commercial value of the cut food pieces is dependent upon the quality of the cuts. Broken or irregular cut food pieces have less commercial value and as a result, continuous work has been done over the years to improve the quality of the cut food pieces coming out of a hydraulic cutter. Hydraulic food cutting devices are high capacity cutting machines and are not labor intensive, usually only requiring one operator to monitor hydraulic cutter operation. Thus if properly arranged and assembled they can be significantly efficient and an effective way to produce food products.

While there are a wide variety of food products that are cut using hydraulic food cutters, these types of devices are predominantly used for cutting potatoes and other types of food that are generally uniform throughout. Other types of foods, including foods that have a core or a stem have typically not been successfully processed in such a device. In addition, the configuration of the blades in most of these devices together with the forces utilized in processing these materials have typically rendered such devices unacceptable for use in devices for activities such as coring, and slicing food products such as peppers.

Peppers, more particularly bell peppers, of whatever color, red, green or yellow, jalapeno peppers, and pimento peppers have always been deemed to be difficult to commercially process. The primary problem exists in finding an efficient and rapid way to remove the pepper core, consisting of the stem end, seed pod and seeds, hereinafter collectively referred to as the core, from the remaining portions of the pepper without obliterating or breaking the device into small pieces. There are several methods that have been developed to core these peppers.

The first method involves the use of some sort of a single blade rotating coring knife, over which the pepper is positioned, stem down, so that the coring knife can bore in cutting out the core and the seed pod. The second method is in more common use today, particularly where there is no need to retain the original configuration of the pepper as a unitary piece. This method involves crushing the peppers and then hand sorting out either the broken usable pieces, or the opposite, hand separating the remains of the cores. The broken pieces are then washed and usually conveyed on for further processing, such as dicing, for inclusion in prepared food products whether canned, frozen, freeze dried or whatever.

A common characteristic to peppers which enables the crushing process to be used, is the fact that the wall of the pepper is brittle enough in its cellular composition that it will break after some initial plastic deformation, if enough force is impacted against the wall of the pepper.

These two prior art methods and processes for coring peppers can generally be described as mechanical approaches, since they both involve the use of mechanical machines to either crush the peppers or to bore out the stem and core.

U.S. Pat. No. 5,390,590 to Mendenhall describes a method and device for separating cores and seeds from peppers utilizing a hydrocutting apparatus. This device utilizes a squeeze type of chamber to receive items such as peppers and to squeeze the core and seeds out of them and break them into pieces so that they can later be separated. This device however does not allow for the peppers to be cored and sliced, which is a desired form that many parties wish to purchase. The Mendenhall device simply breaks the whole pepper into pieces. There is no device, which is known to the Applicant that allows food products such as peppers to be cored and sliced in a hydrocutting apparatus. The use of a hydrocutting apparatus is significantly more cost effective and efficient as compared to other types of devices and methods that may be utilized to perform such a function.

Accordingly it is an object of the present invention to provide a method and device which can be utilized to core and slice food products such as peppers in such a way so as to cause the general shape and integrity of the food product to be maintained and to do so utilizing a device such as a hydrocutting device which provides significant advantages and efficiencies as compared to other types of devices which exist in the prior art.

Additional objects, advantages and novel features of the invention will be set forth in part in the description which follows and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE PRESENT INVENTION

The present invention is a method and device for coring and cutting food products such as peppers in a device such as a hydrocutter. The hydrocutter is known in the prior art and is made up of a series of tubes which are functionally interconnected to a tub and a pump which functions to pump material, which are to be processed against a cutting mechanism. After impact upon the cutting mechanism has taken place, a way is provided whereby the material which has been cut is separated and sorted, the water which has been utilized to carry the products through the device is removed and the desired items can be recovered.

In such an embodiment, the present invention is a cutting assembly for cutting and coring products in such a hydrocutter. This cutting assembly is made up of an outer rim, which is configured for placement within a hydrocutter. This rim has a first end and a second end and defines a passageway there through. The size of the rim can be determined and modified according to various factors including the dimensions of the hydrocutter, the size of the items that are to be processed and a variety of other factors.

A coring cutter is suspended in a generally centrally located position within this passageway. This coring cutter may be variously dimensioned so as to accomplish a variety of types of cutting and coring activities depending upon the needs and necessities of the user. In the preferred embodiment of the invention, the cutting device includes a pair of peaks, which define a pair of troughs in between. These peaks are oriented and positioned so as to impact the item being processed prior to the other portions of the coring cutter and by so doing enable the device to be cut with decreased amounts of force and water pressure upon the device. In the preferred embodiment of the invention, which is shown in the attached figures, this coring cutter includes a generally open frustoconical portion which is positioned so that the smaller portion of the frustoconical portion faces an open first end of the passageway so as to first impact against a portion of the item which is to be cut.

This coring cutter is suspended in this generally centrally located position within said passageway by an intermediary knife, which connects the coring cutter and the outer rim. In addition to holding the coring cutter in a desired position, the intermediary knife assists to slice the product that is impacted against this knife.

In the preferred embodiment of the invention shown in the attached figures, this intermediary knife is angledly connected between the rim and the coring cutter. In this embodiment the intermediary knife extends back from the connection between this knife and the rim to its connection with the coring cutter. In other embodiments of the invention, additional intermediary knives may also be included between the coring cutter and the outer rim.

In the preferred embodiment of the invention, all of these items are installed as a single piece into the cutting portion of the hydrocutter. This device can then be utilized to perform the method of the present invention wherein a device that has all of the features described above is provided, installed and aligned within a hydrocutting device. Once installed, a food product such as a pepper is forced against the blades of the cutting device with sufficient force so as to cause the item to be forced against the blade of the device whereby the core portion is cut out of the device and the item is sliced as desired.

The purpose of the foregoing Abstract is to enable the public, and especially the scientists, engineers, and practitioners in the art who are not familiar with patent or legal terms or phraseology, to determine quickly from a cursory inspection, the nature and essence of the technical disclosure of the application. The Abstract is neither intended to define the invention of the application, which is measured by the claims, nor is it intended to be limiting as to the scope of the invention in any way.

Still other features and advantages of the present invention will become readily apparent to those skilled in this art from the following detailed description describing preferred embodiments of the invention, simply by way of illustration of the best mode contemplated by carrying out my invention. As will be realized, the invention is capable of modification in various obvious respects all without departing from the invention. Accordingly, the drawings and description of the preferred embodiments are to be regarded as illustrative in nature, and not as restrictive in nature.

DESCRIPTION OF THE PREFERRED EMBODIMENTS

Figure 1:
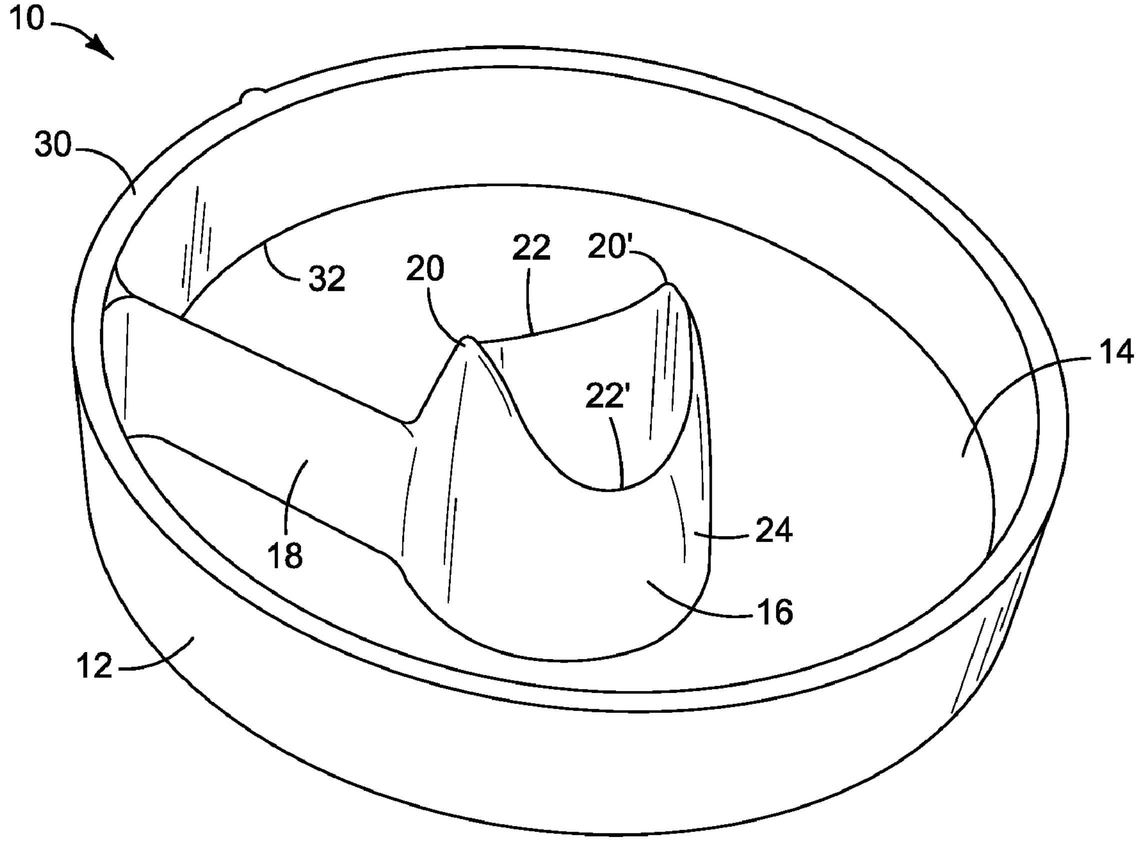
FIG. 1 is a top perspective view of a preferred first embodiment of the invention.
Figure 2:
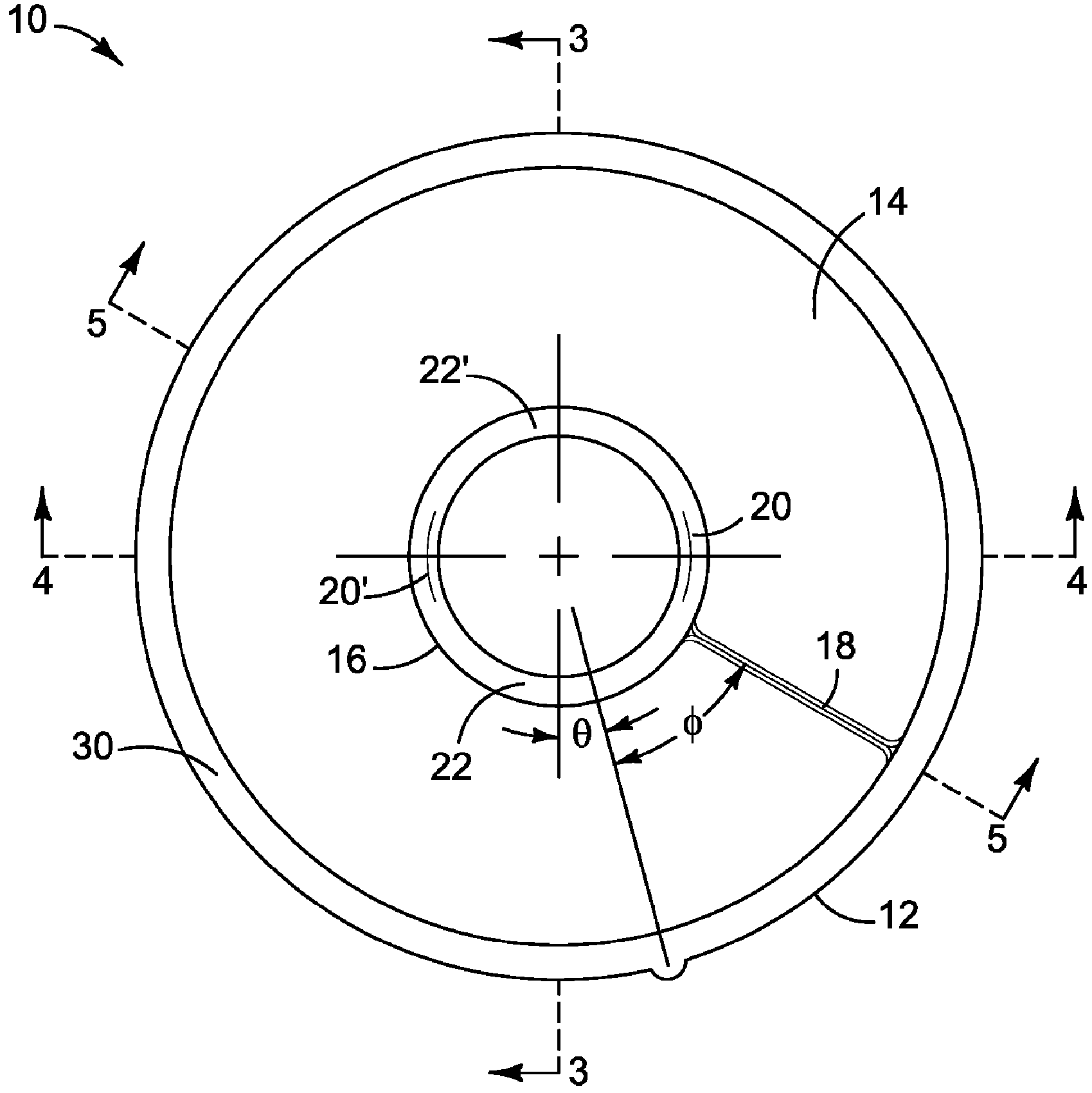
FIG. 2 is a top view of the embodiment of the invention shown in FIG. 1.
Figure 3:
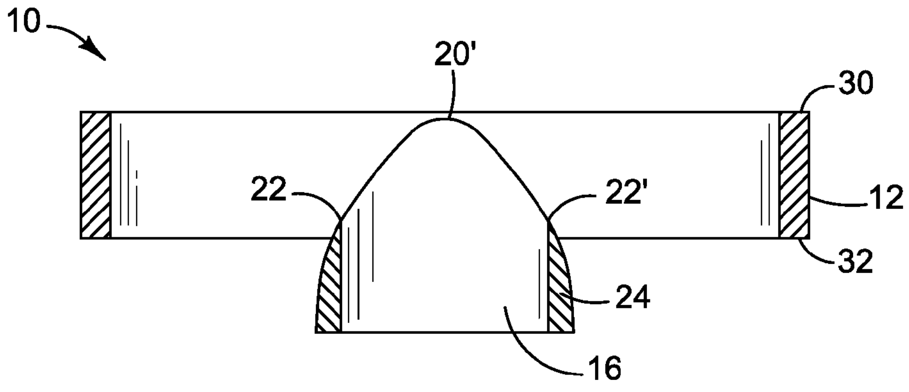
FIG. 3 is a first cutaway side view of the embodiment of the invention shown in FIG. 1.
Figure 4:
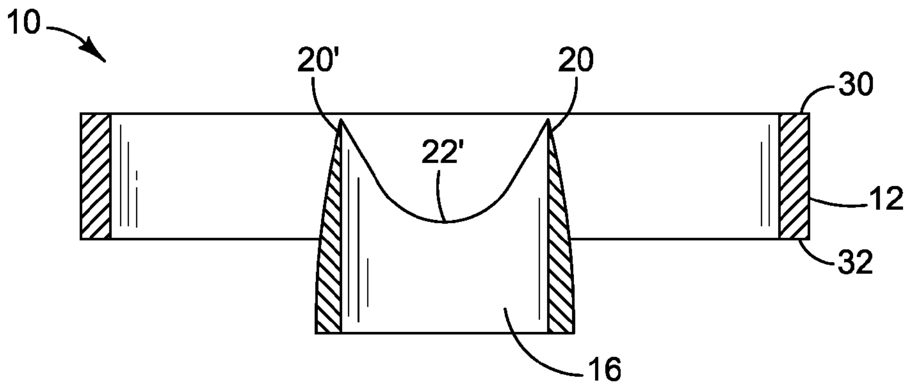
FIG. 4 is a second cut away view of the embodiment of the invention shown in FIG. 1.
Figure 5:
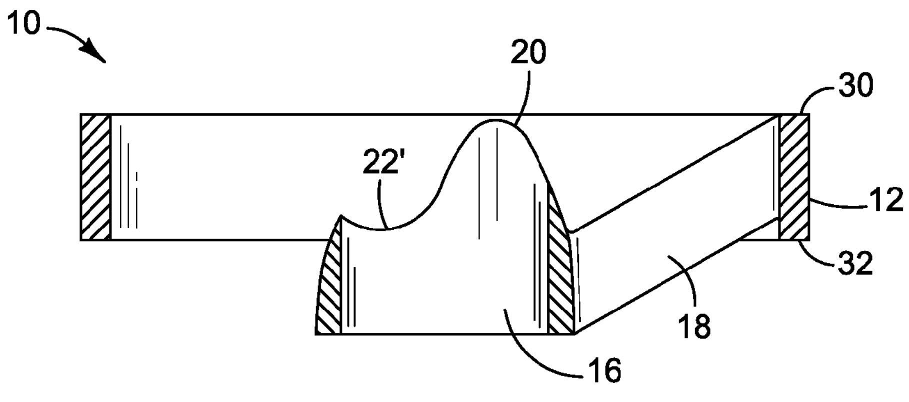
FIG. 5 is a third cut away view of the embodiment of the invention shown in FIG. 1

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

In the following description and in the figures, like elements are identified with like reference numerals. The use of "or" indicates a non-exclusive alternative without limitation unless otherwise noted. The use of "including" means "including, but not limited to," unless otherwise noted.

The present invention is a method and device for coring and cutting food products such as peppers in a device such as a hydrocutter. The hydrocutter is known in the prior art and is made up a series of tubes which are functionally interconnected to a tub and a pump which functions to pump material which are to be processed against a cutting mechanism. After impact upon the cutting mechanism has taken place, a way is provided whereby the material which has been cut is separated and sorted, the water which has been utilized to carry the products through the device is removed and the desired items can be recovered.

Referring now to FIGS. 1-7 a variety of views of the present invention are shown. Referring first to FIG. 1, a top perspective view of the preferred embodiment of the present invention is shown. The present invention 10 is a cutting assembly for use in a hydrocutter, which enables various products such as food products to be cored and cut. This assembly 10 includes an outer rim 12, which defines a passageway 14. In the preferred embodiment of the invention, this rim has a first end 30 and a second end 32. These ends are generally open so as to allow passage of material through the passageway 14, which is defined by the outer rim 12. The size and dimensions of the rim can be determined and modified according to various factors including the dimensions of the hydrocutter, the size of the items which are to be processed and a variety of other factors and considerations.

Figure 7:
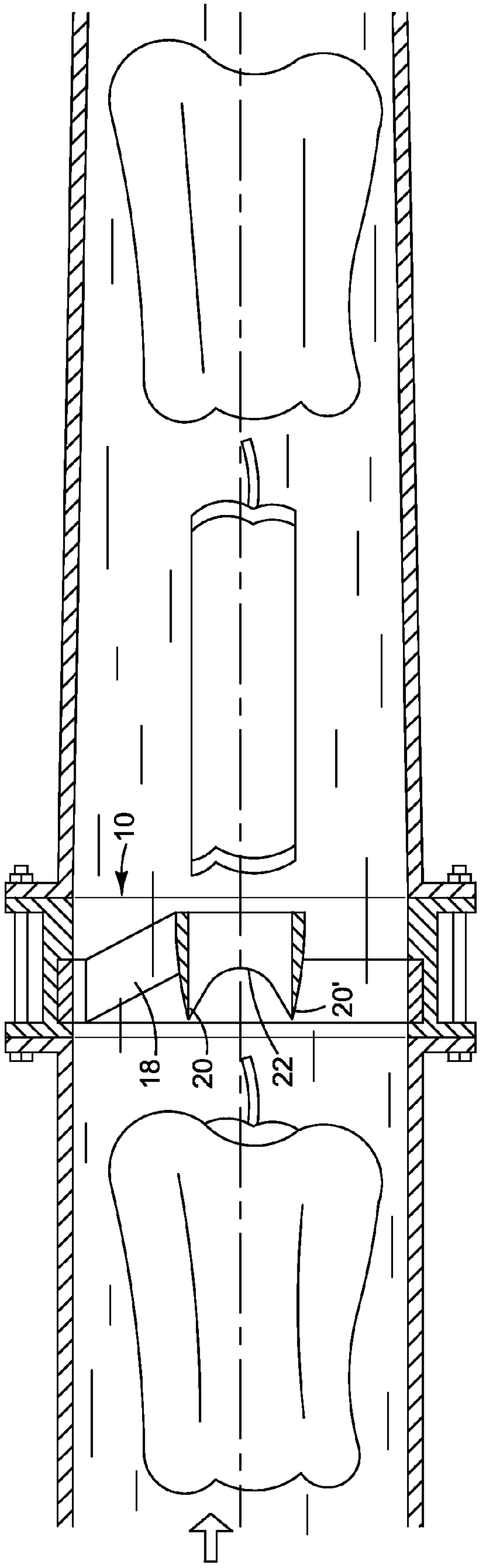
FIG. 7 is a cut away top view of the invention in place and in use to cut peppers.

A coring cutter 16 is suspended in a generally centrally located position within the passageway 14. This coring cutter 16 may be variously dimensioned so as to accomplish a variety of types of cutting and coring activities depending upon the needs and necessities of the user. In the preferred embodiment of the invention, the coring cutter 16 includes a pair of peaks 20/20' which define a pair of troughs 22, 22' there between. These peaks 20/20' are oriented and positioned so as to impact the item being processed prior to the other portions of the coring cutter 16 or the assembly 10 and by so doing enables the product to be cut with decreased amounts of force and water pressure. This assists to preserve these items in a desired and designated condition. An example of such a configuration in use is shown in FIG. 7 of the present application.

FIGS. 2-5 show various detailed and cutaway views of the blade-cutting assembly of the present invention. In the preferred embodiment of the invention, which is shown in these figures, this coring cutter 16 also includes a generally open frustoconical portion 24 which is positioned so that the smaller portion of the frustoconical portion faces an open first end of the passageway 14 so as to first impact against a portion of the item which is to be cut. The generally open configuration is also configured so as to allow the core portion of the product that has been cut and removed to pass through the coring cutter 16 and thus allowing the coring cutter to be ready to receive and cut a subsequent item.

This coring cutter 16 suspended in this generally centrally located position within said passageway 14 by an intermediary knife 18, which connects the coring cutter 16 and the outer rim 12. In addition to holding the coring cutter 16 in a desired position, the intermediary knife 18 assists to slice the products or items which are impacted against this knife 18.

Preferably, the cutting assembly of the present invention is made from a single piece of material that can be cast as a single piece or machined from a single piece of material or welded together from sub assemblies. This single piece construction provides greater durability and increased life expectancy over clamped type of assemblies. The presence of the peaks and trough portions of the assemblies provide a two-point initial pierce point for the initial core cut. This reduces the force required to initiate the core cut, reduces water and product velocity that are required to make a successful cut, and reduces the likelihood of the device plugging. This also assists in maintaining the pieces of the products that are processed from being deformed during processing and increases their salability. The angled entry edge of the core support knives reduces the force required to initiate and complete the cut. This contributes to reduced water and product velocity required for successful cuts and reduces tendency of the cutter to plug.

Figure 6:
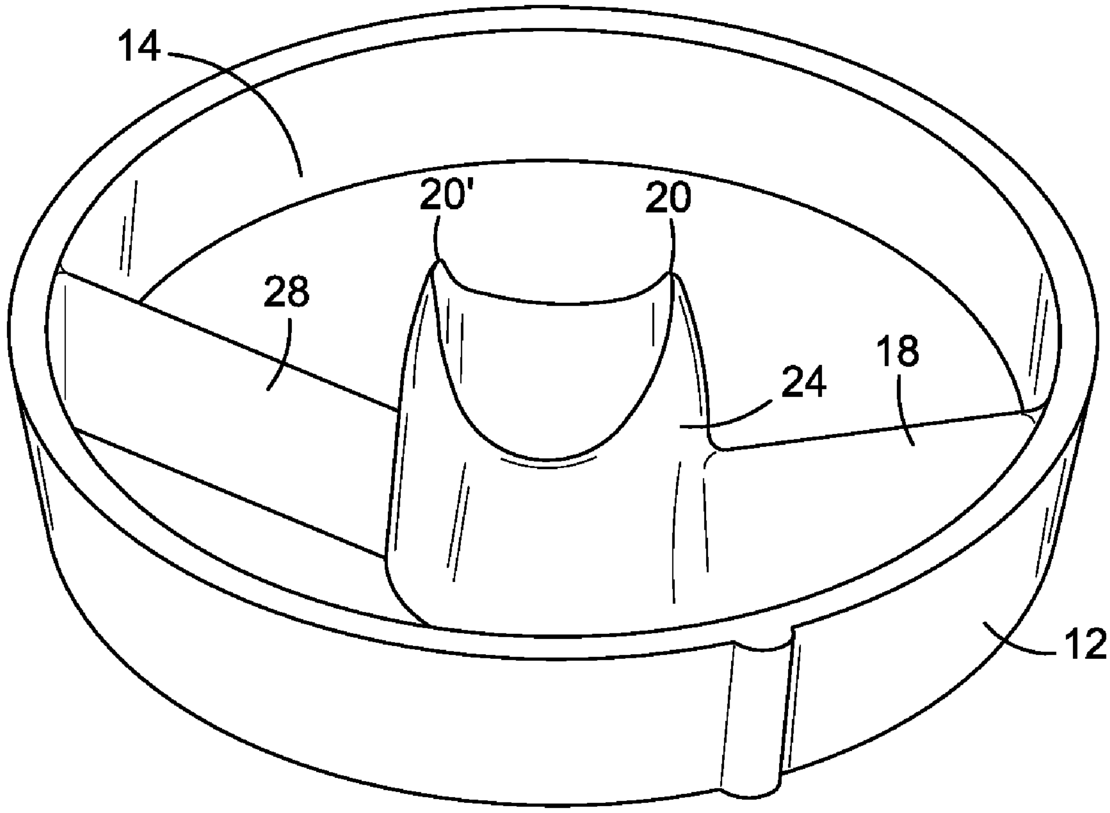
FIG. 6 is a top view of a second preferred embodiment of the invention.

The core diameter and overall dimensions can be increased or decreased to accommodate specific food products, and in the preferred embodiment the knife assembly is keyed to ensure proper alignment. In the preferred embodiment of the invention shown in the attached figures, this intermediary knife 18 is angledly connected between the rim 12 and the coring cutter 16. In this embodiment, the intermediary knife 18 extends back from the connection between this knife 18 and the rim 12 to its connection with the coring cutter 16. In other embodiments of the invention, additional intermediary knives 28 may also be included between the coring cutter and the outer rim. FIG. 6 shows an embodiment of the invention in such a circumstance.

In the preferred embodiment of the invention, the cutting assembly 10 which contains all of these features are loaded as a single piece into a hydrocutter of the present invention. This device can then be utilized to perform the method of the present invention wherein a device that has all of the features described above is provided, installed and aligned within a hydrocutting device. Once so installed, a product such as a pepper is forced against the blades of the cutting device with sufficient force so as to cause the item to be forced against the blade of the device whereby the core portion is cut out of the device and the item is sliced as desired. An example of such a situation is shown in FIG. 7.

While there is shown and described to the present preferred embodiment of the invention, it is to be distinctly understood that this invention is not limited thereto, but may be variously embodied to practice within the scope of the following claims. From the foregoing description, it will be apparent that various changes may be made without departing from the spirit and scope of the invention as defined by the following claims.

What is claimed is:

1. A cutting assembly for cutting and coring products in a hydrocutter said assembly comprising:

an outer rim configured for placement within a hydrocutter, said rim defining a passageway therethrough; and a coring cutter suspended in a generally centrally located position within said passageway by at least one intermediary knife, which connects said coring cutter and said outer rim, said coring cutter consists of at least two peaks which define at least two troughs, wherein said peaks are positioned so as to impact said item prior to any other portion of said coring cutter, wherein said peaks comprise a generally rounded shape, wherein said troughs comprise a generally rounded shape, whereby products to be cut and cored travel through said passageway and are cut and cored by said coring cutter and said intermediary knife.

2. The cutting assembly of claim 1 wherein said coring cutter is generally circular.

3. The cutting assembly of claim 1 wherein said coring cutter includes a generally open frustoconical portion which is positioned so that the smaller portion of the frustoconical portion faces an open first end of the passageway so as to first impact against a portion of the item which is to be cut.

4. The cutting assembly of claim 1 wherein said intermediary knife is angledly connected between said rim and said coring cutter.

5. The cutting assembly of claim 1 further comprising a second intermediary knife connected between said coring cutter and said outer rim.

6. The cutting assembly of claim 1 wherein said device is a single piece.

7. The cutting assembly of claim 1 wherein said intermediary knife is angledly connected between said rim and said coring cutter so that a portion of said intermediary extends back from said rim to said coring cutter.

8. The cutting assembly of claim 3 wherein said peaks of said coring cutter do not extend beyond a front plane of said outer rim.

9. A cutting device for cutting and coring food products in a hydrocutter said device comprising:

an outer rim configured for placement within a hydrocutter, said outer rim having a first and a second end and defining a passageway therethrough;

a coring cutter suspended in a generally centrally located position within said passageway by at least one angled intermediary knife, said coring cutter consists of at least two peaks which define at least two troughs, wherein said peaks are positioned so as to impact said item prior to any other portion of said coring cutter, wherein said peaks comprise a generally rounded shape, wherein said troughs comprise a generally rounded shape, said angled intermediary knife connecting said coring cutter and said outer rim, whereby products to be cut and cored travel through said passageway and are cut and cored by said coring cutter and said intermediary knife.

10. The cutting device of claim 9 where in wherein said coring cutter is generally circular.

11. The cutting device of claim 9 wherein said coring cutter includes a generally open frustoconical portion which is positioned so that the smaller portion of the frustoconical portion faces an open first end of the passageway so as to first impact against a portion of the item which is to be cut.

12. The cutting device of claim 9 wherein said intermediary knife is angledly connected between said rim and said coring cutter.

13. The cutting device of claim 9 further comprising a second intermediary knife connected between said coring cutter and said outer rim.

14. The cutting device of claim 9 wherein said device is a single piece.

15. The cutting device of claim 9 wherein said intermediary knife is angledly connected between said rim and said coring cutter so that a portion of said intermediary extends back from said rim to a connection with said coring cutter.

16. The cutting device of claim 9 wherein said peaks of said coring cutter do not extend beyond a front plane of said outer rim.

17. A method for cutting and coring food products in a hydrocutter, comprising the steps of:

providing a device for cutting and coring food products, said device comprising an outer rim configured for placement within a hydrocutter, said rim defining a passageway therethrough; and a coring cutter suspended in a generally centrally located position within said passageway by at least one intermediary knife, which connects said coring cutter and said outer rim, said coring cutter consists of at least two peaks which define at least two troughs, wherein said peaks are positioned so as to impact said item prior to any other portion of said coring cutter, wherein said peaks comprise a generally rounded shape, wherein said troughs comprise a generally rounded shape, whereby products to be cut and cored travel through said passageway and are cut and cored by said coring cutter and said intermediary knife;

positioning said device within a cutting portion of a hydrocutter; and forcing a previously aligned food product to impinge upon said device so as to cut and core said previously aligned food product.

18. The method of claim 17 wherein said food product is a pepper.

* * * * *